(12) United States Patent
Egashira et al.

(10) Patent No.: US 8,642,148 B2
(45) Date of Patent: Feb. 4, 2014

(54) ELECTRIFYING ROLLER

(75) Inventors: Izumi Egashira, Yokohama (JP);
Hirotaka Tagawa, Yokohama (JP);
Junichi Takano, Yokohama (JP);
Daijirou Sirakura, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 329 days.

(21) Appl. No.: 13/059,886

(22) PCT Filed: Aug. 24, 2009

(86) PCT No.: PCT/JP2009/064741
§ 371 (c)(1),
(2), (4) Date: May 12, 2011

(87) PCT Pub. No.: WO2010/021402
PCT Pub. Date: Feb. 25, 2010

(65) Prior Publication Data
US 2012/0129666 A1    May 24, 2012

(30) Foreign Application Priority Data

Aug. 22, 2008 (JP) ................. 2008-214684

(51) Int. Cl.
*B32B 1/08* (2006.01)
*B32B 15/06* (2006.01)
*G03G 15/02* (2006.01)

(52) U.S. Cl.
USPC .................. 428/36.91; 428/462; 399/168

(58) Field of Classification Search
None
See application file for complete search history.

(56) References Cited

U.S. PATENT DOCUMENTS

2006/0074209 A1*  4/2006  Mizutani et al. ............ 526/319
2008/0220179 A1   9/2008  Akama et al.

FOREIGN PATENT DOCUMENTS

| CN | 1882659 A | 12/2006 |
|---|---|---|
| CN | 101048708 A | 10/2007 |
| EP | 2 073 068 A1 | 6/2009 |
| JP | 9-325563 A | 12/1997 |
| JP | 2006-184895 A | 7/2006 |
| JP | 2007-121445 A | 5/2007 |
| JP | 2007-163574 A | 6/2007 |
| JP | 2007-206443 A | 8/2007 |
| JP | 2007-233367 A | 9/2007 |
| JP | 2007-248945 A | 9/2007 |
| JP | 2008-122858 A | 5/2008 |
| JP | 2008-292659 A | 12/2008 |

OTHER PUBLICATIONS

Machine translation of JP 2007-206443, Aug. 2007.*
First Office Action issued Jul. 3, 2012 in Chinese Patent Application No. 200980132840.0 to Bridgestone Corporation with partial English translation.

* cited by examiner

*Primary Examiner* — Ramsey Zacharia
(74) *Attorney, Agent, or Firm* — Sughrue Mion, PLLC

(57) ABSTRACT

Provided is an electrifying roller which is manufactured more easily, and has a good electrical conduction property with a small amount of electrically conductive material.

Provided are electrifying rollers (10, 20) comprising a shaft 1, an elastic layer 2 formed on the periphery of the shaft 1, and a surface layer 3 formed on the periphery surface of the elastic layer 2, wherein the elastic layer 2 is formed by an ultraviolet curing resin having a phosphoester group. It is preferred that the ultraviolet curing resin be made of a compound represented by the following Formula (1):

(1)

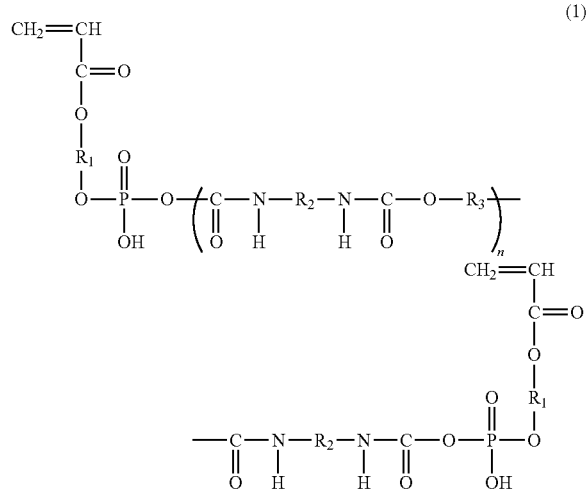

(wherein $R_1$ is represented by the following Formula (2):

$-(CH_2)-m$     (2)

(where m is an integer from 1 to 10),
$R_2$ is represented by any one of the following Formulae (3) to (9):

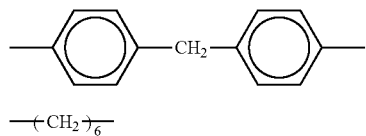

(3)

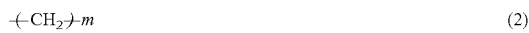

(4)

$-(CH_2)_6-$     (5)

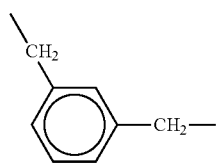

(6)

-continued

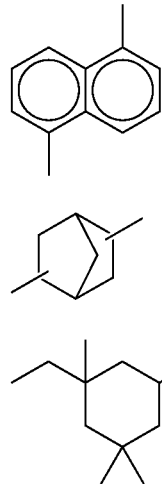
(7)

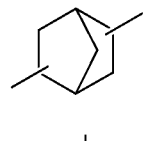

(8)

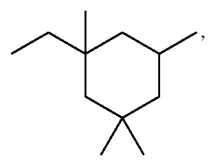

(9)

$R_3$ is represented by any one of the following Formulae (10) to (12):

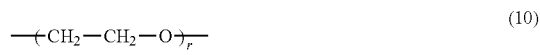

(10)

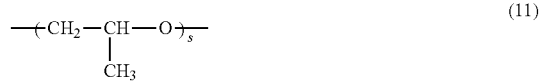

(11)

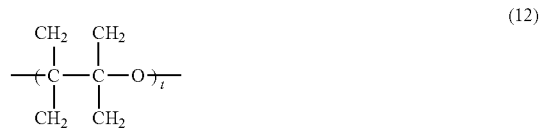

(12)

(where r, s and t are an integer from 10 to 150), and n is an integer from 1 to 10).

4 Claims, 1 Drawing Sheet

ELECTRIFYING ROLLER

This application is a National Stage of International Application No. PCT/JP2009/064741 filed Aug. 24, 2009, claiming priority based on Japanese Patent Application No. 2008-214684, filed Aug. 22, 2008, the contents of all of which are incorporated herein by reference in their entirety.

TECHNICAL FIELD

The present invention relates to an electrifying roller (hereinafter, also simply referred to as "roller"), and more particularly, to an electrifying roller which is manufactured more easily, and has a good electrical conduction property with a small amount of electrically conductive material.

BACKGROUND ART

Generally, in an electrophotography image forming apparatus such as a copier, a printer, a facsimile or the like, a roller which is provided with electrical conductivity such as a transfer roller, a developing roller, a toner supplying roller, an electrifying roller, a cleaning roller, an intermediate transfer roller, a belt driving roller or the like is employed for each process of the image forming apparatuses.

As such a conductive roller, an electrifying roller or the like has been known which is formed by providing an electrically conductive shaft made of metal or polymer with an elastic layer made of foamed or non-foamed rubber, and providing thereon one or more skin layers. Particularly, in order for an organic photoreceptor to be electrically charged uniformly, the elastic layer of an electrifying roller requires suitable low hardness and low permanent compression set for maintaining the contact surface with a photoreceptor uniform. As a result, conventionally, rubber, elastomer, foam urethane or the like is employed for the material of elastic layers (Patent Documents 1 to 3). Conventionally, for an electrifying roller, an electrically conductive material such as carbon black or ionic electrically conductive material is used for securing a required resistance.

On the other hand, an ultraviolet curing resin is known to be employed as the elastic roller of the electrically conductive roller, and also in the variety of electrically conductive rollers manufactured by using an ultraviolet curing resin, an ionic electrically conductive material is used.

However, ionic electrically conductive materials are highly dependent on the volume specific resistivity, and when a large amount ionic electrically conductive material is used, bleeding occurs.

Accordingly, the use of an electrically conductive material with small environmental variation is considered, and in the Patent Document 4, disclosed is an electrically conductive roller whose elastic layer is composed of an ultraviolet curing resin in which materials for the elastic layer comprising a urethane acrylate oligomer, photopolymerization initiator and lithium salt are cured by ultraviolet irradiation.

RELATED ART DOCUMENT

Patent Document

Patent Document 1: Japanese Unexamined Patent Application Publication No. H9-325563
Patent Document 2: Japanese Unexamined Patent Application Publication No. 2007-163574
Patent Document 3: Japanese Unexamined Patent Application Publication No. 2007-121445
Patent Document 4: Japanese Unexamined Patent Application Publication No. 2007-206443

SUMMARY OF THE INVENTION

Problems to be Solved by the Invention

However, in the method described in the Patent Document 4, although an electrifying roller having a good electrical conduction property can be provided because an electrically conductive material with small environmental variation is used for the roller, since it is necessary to add an electrically conductive material, there is room for improvement in cost and the electrical conduction property.

In the conventional electrically conductive rollers described in the Patent Documents 1 to 3, since the elastic layer is formed by foam rubber or non-foam rubber, as the processes, an assembling process, a preheating process, a casting process, a heat curing process, a cooling process and a solid layer (resistivity adjusting layer or the like) manufacturing process are needed, and particularly, a long time is needed for a drying process, which is desired to be improved.

Accordingly, an object of the present invention is to overcome the above-mentioned problems and to provide an electrifying roller which is manufactured more easily, and has a good electrical conduction property with a small amount of electrically conductive material.

Means for Solving the Problems

To solve the above-mentioned problems, the present inventors intensively studied to discover that an electrifying roller which is manufactured more easily, and has a good electrical conduction property with a small amount of electrically conductive material can be obtained by forming an elastic layer by a specific ultraviolet curing resin, thereby completing the present invention.

That is, the electrifying roller of the present invention is an electrifying roller comprising a shaft, an elastic layer formed on the periphery of the shaft, and a surface layer formed on the periphery surface of the elastic layer, wherein
said elastic layer is formed by an ultraviolet curing resin having a phosphoester group.

In the electrifying roller of the present invention, it is preferred that
said ultraviolet curing resin be made of a compound represented by the following Formula (1):

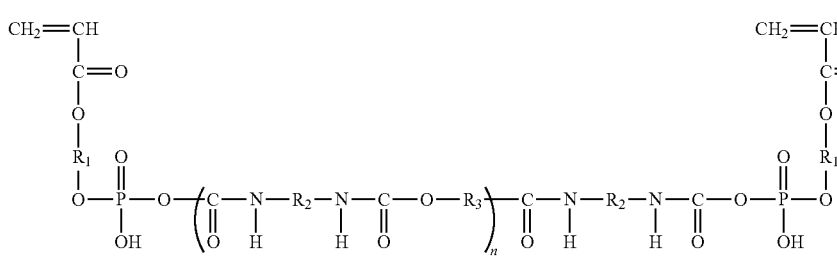
(1)

(wherein $R_1$ is represented by the following Formula (2):

  (2)

(where m is an integer from 1 to 10),
$R_2$ is represented by any one of the following Formulae (3) to (9):

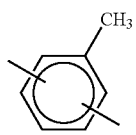  (3)

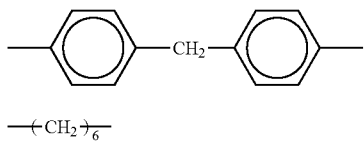  (4)

  (5)

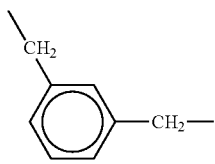  (6)

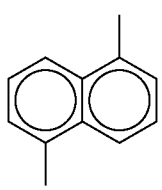  (7)

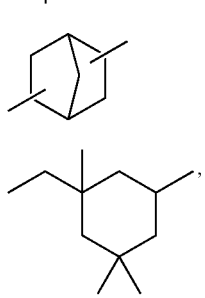  (8)
(9)

$R_3$ is represented by any one of the following Formulae (10) to (12):

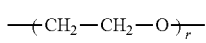  (10)

-continued

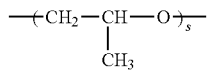  (11)

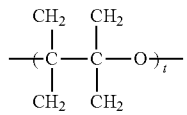  (12)

(where r, s and t are an integer from 10 to 150), and n is an integer from 1 to 10), and that the volume specific resistivity of said elastic layer be $1 \times 10^4$ to $1 \times 10^8$ $\Omega \cdot cm$.

Further, it is preferred that, in the electrifying roller of the present invention, the thickness of said elastic layer be 0.9 to 1.3 mm, and that said shaft be a hollow cylinder or solid cylinder made of metal.

Effects of the Invention

By the present invention, an electrifying roller which is manufactured more easily, and has a good electrical conduction property with a small amount of electrically conductive material can be provided.

MODES FOR CARRYING OUT THE INVENTION

Preferred embodiments of the present invention will now be described in detail with reference to the figures.

Figure 1:
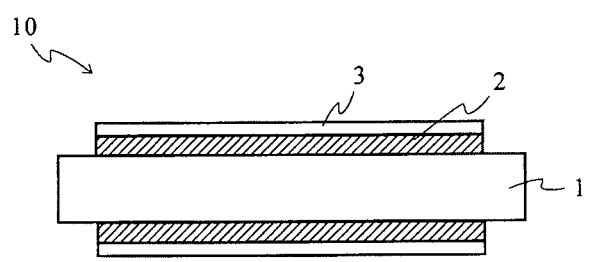
FIG. 1 is a drawing illustrating one example of preferred embodiments of an electrifying roller of the present invention.

FIG. 1 is a drawing illustrating one example of preferred embodiments of an electrifying roller of the present invention. An electrifying roller 10 of the present invention has a shaft 1, an elastic layer 2 formed on the periphery of the shaft 1, and a surface layer 3 formed on the periphery surface of the elastic layer 2.

In the present invention, it is important that the elastic layer 2 be formed by an ultraviolet curing resin having a phosphoester group. By using such an ultraviolet curing resin for the elastic layer 2, curing can be performed in a short time, and time for drying process and heat energy can be saved. Since an ionic electrically conductive material is not used or the amount of ionic electrically conductive material can be very small, bleeding of the ionic electrically conductive material can be prevented, and further, the cost of material can be reduced. As a result, an electrifying roller 10 which is manufactured more easily, and has a good electrical conduction property with a small amount of electrically conductive material. In the present invention, it is preferred that an ionic electrically conductive material be not used.

In the present invention, the ultraviolet curing resin is not restricted as long as the resin has a phosphoester group and an intended effect of the present invention can be obtained, and preferably made of a compound represented by the following Formula (1):

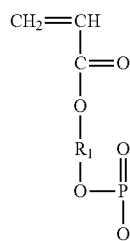

(wherein $R_1$ is represented by the following Formula (2):

 (2)

(where m is an integer from 1 to 10), $R_2$ is represented by any one of the following Formulae (3) to (9):

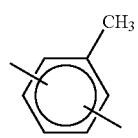 (3)

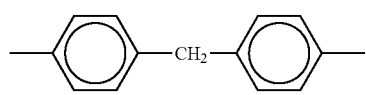 (4)

 (5)

(6)

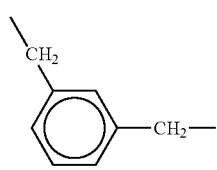 (7)

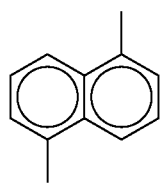 (8)

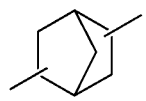 (9)

$R_3$ is represented by any one of the following Formulae (10) to (12):

 (10)

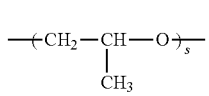 (11)

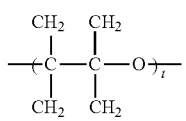 (12)

(where r, s and t are an integer from 10 to 150), and n is an integer from 1 to 10), and particularly the resin is preferably an oligomer.

The above-mentioned ultraviolet curing resins may be used alone, or two or more of these which have different molecular chains may be mixed to be used. The above-mentioned compound may comprise, other than the very small amount of below-described electrically conductive material, a reactive diluent as required. The above-mentioned compound is preferred to comprise a photopolymerization initiator and photopolymerization accelerator. The compound may comprise other known additives as required.

In the present invention, as the electrically conductive materials which may be added to the ultraviolet curing resin of the elastic layer 2, suitable one may be employed. Carbon-based electrically conductive materials such as Ketjen black and acetylene black and carbon blacks for rubber such as SAF, ISAF, HAF, FEF, GPF, FT, MT may be used, and carbon blacks for ink such as oxidized carbon black, thermally decomposed carbon black, graphite, or the like may also be used.

High-polymer ionic electrically conductive materials may be added as the electrically conductive material, and as such a high-polymer ionic electrically conductive material, for example, those described in Japanese Unexamined Patent Application Publication No. 9-227717, Japanese Unexamined Patent Application Publication No. 10-120924 and Japanese Unexamined Patent Application Publication No. 2000-327922 may be used, but not limited thereto.

Concretely, a mixture of
(A) organic polymer material
(B) ion conducting polymer or copolymer and
(C) inorganic or low-molecular weight organic salts can be exemplified. Examples of component (A) include polyacrylic ester, polymethacrylic ester, polyacrylonitrile, polyvinyl alcohol, polyvinyl acetate, polyamide, polyurethane or polyester; examples of component (B) include oligoethoxylated acrylate or mathacrylate, oligoethoxylated styrene at the aromatic ring, polyether urethane, polyether urea, polyether amide, polyether ester amide or polyether ester; and
examples of component (C) include alkaline metal, alkaline earth metal, zinc or ammonia salt of inorganic or low-molecular organic protonic acids, and component (C) is preferably $LiClO_4$, $LiCF_3SO_3$, $NaClO_4$, $LiBF_4$, $NaBF_4$, $KBF_4$, $NaCF_4SO_3$, $KClO_4$, $KPF_6$, $KCF_3SO_3$, $KC_4F_9SO_3$, $Ca(ClO_4)_2$, $Ca(PF_6)_2$, $Mg(ClO_4)_2$, $Mg(CF_3SO_3)_2$, $Zn(ClO_4)_2$, $Zn(PF_6)_2$, $Ca(CF_3SO_3)_2$ or the like.

In the present invention, a method of forming the above-mentioned elastic layer 2 is not particularly restricted, and usually a method is employed in which a coating solution in which the above-mentioned ultraviolet curing resin component, an electrically conductive material and the like are dispersed or dissolved is prepared and this coating solution is applied on the above-mentioned shaft 1 by dipping method, spray method, roll coater method, die coat method or the like to be solidified by drying. In particular, a dipping method is preferably used. Simplification of manufacturing process is possible by directly applying the ultraviolet curing resin on the shaft 1.

The volume specific resistivity of the elastic layer 2 of the electrifying roller 10 of the present invention is preferably $1\times10^4$ to $1\times10^8$ Ω·cm. Such a range can provide an electrifying roller having more excellent electrical conduction property. When the electrifying roller is used in an image forming apparatus, a more preferable image can be obtained.

The thickness of the elastic layer 2 of the electrifying roller 10 of the present invention is preferably 0.9 to 1.3 mm. A spark discharge can be prevented by setting the thickness of the elastic layer 2 in the above range. If the thickness of the elastic layer 2 is less than 0.9 mm, in a high temperature and low humidity area represented by Central America or the like, it is feared that a spark discharge occurs from a core bar (shaft) to a photoreceptor, which is not preferable. On the other hand, if the thickness of the elastic layer 2 is more than 1.3 mm, it becomes significantly difficult to control the external diameter of the roller during dipping application, which is not preferable since difference between the right side and the left side is likely to occur. If the difference between the external diameters of the roller at the right side and the left side is too large, adhesion of the electrifying roller to the photoreceptor becomes ununiform, and particularly adhesion of the electrifying roller to the photoreceptor at the side at which the external diameter is smaller becomes insufficient and charging ability cannot be fully exerted, therefore, it is feared that a problem of black patches occurs during an image evaluation.

In the present invention, as the shaft 1, those which are made of metal or plastic and in a hollow cylinder or solid cylinder shape may be used, and preferably, the shaft 1 is a hollow cylinder or solid cylinder made of metal, and more preferably, the shaft 1 is a hollow cylinder made of metal. By this, the cost can be reduced.

In the present invention, as the resin forming the surface layer 3, a resin which is usually used for an electrifying roller can be used. For example, the below-described ultraviolet curing resin and heat curing resin may be exemplified.

Examples of the ultraviolet curing resin used as the surface layer 3 include polyester resin, polyether resin, fluororesins, epoxy resin, amino resin, polyamide resin, acrylate resin, acrylic urethane resin, urethane resin, alkyd resin, phenol resin, melamine resin, urea resin, silicone resin, polyvinyl butyral resin, vinyl ether resin, vinyl ester resin, and modified resins into which a particular functionality is introduced thereto, and these resins may be used alone or two or more of these may be mixed to be used. The above-mentioned compound may comprise, other than the very small amount of the above-described electrically conductive material, a reactive diluent as required. The above-mentioned compound is preferred to comprise a photopolymerization initiator and photopolymerization accelerator. The compound may comprise other known additives as required.

In the present invention, as the heat curing resin which can be used as the surface layer 3, known rubbers or resins used when the surface of an electrifying member is formed may be used, and although not limited thereto, urethane modified acrylic resins, polyurethane resins, acrylic resins, polyamide resins and fluoride resins are exemplified and one or more of these may be mixed to be used. Among these, fluororesins are preferably used from the viewpoint that the surface of an electrifying roller can be provided with anti-toner adhesiveness.

As the fluororesins, concretely, polytetrafluoroethylene, tetrafluoroethylene perfluoro alkyl vinyl ether copolymer, tetrafluoroethylene ethylene copolymer, polychlorotrifluoroethylene resin, chlorotrifluoroethylene ethylene copolymer, tetrafluoroethylene vinylidene fluoride copolymer, poly vinylidene fluoride, polyvinyl fluoride and the like are exemplified.

In the resin which forms this surface layer 3, although not restricted thereto, a very small amount of electrically conductive material may be added to provide or adjust the electric conductivity (electric resistance) on the surface layer. In this case, as the electric conductive material, although not restricted thereto, a variety of electric electrically conductive material or ionic electrically conductive material may be used, and particularly carbon is preferably used in the present invention.

The amount of the electrically conductive material added can be adjusted as appropriate so that a desired resistance is obtained. In this case, the volume specific resistivity of the surface layer 3 is preferably $1\times10^4$ to $1\times10^{12}$ Ω·cm, particularly $1\times10^6$ to $1\times10^8$ Ω·cm, and the amount of the electrically conductive material added can be adjusted so that such a volume specific resistivity is attained. When carbon is employed as the electrically conductive material, the amount of the electrically conductive material added is usually about 1 to 100 phr, and particularly about 10 to 70 phr based on a base resin.

To the resin composition which forms this surface layer 3, an additive such as cross linking agent, thickener, thixotropic agent or structural viscosity agent may be added as required.

The method of forming the above-mentioned layer 3 is not particularly limited, and usually a method in which a coating solution in which the above-mentioned resins, electrically conductive materials and the like are dispersed or dissolved is prepared and this coating solution is applied by dipping method, spray method, roll coater method or the like to be subjected to heat curing is generally employed. The solvent for preparing the coating solution may be suitably selected depending on the type of base resin which constitutes the resin composition or the like. For example, when fluorocarbon resin is employed as the base resin, methyl ethyl ketone (MEK), methyl isobutyl ketone (MIBK), toluene, xylene or the like may be preferably employed.

The thickness of the surface layer 3 is set depending on the shape of the electrifying roller 10 or the like, and not particularly restricted thereto, and may be set usually 1 to 30 μm, particularly 1 to 20 μm. If the thickness is smaller than 1 μm, the durability of the roller is sometimes poor, and on the other hand, if the thickness is larger than 20 μm, there are cases where a good surface quality may not be obtained such as a case where charging characteristics is negatively affected and a case where wrinkle occurs on the surface.

Figure 2:
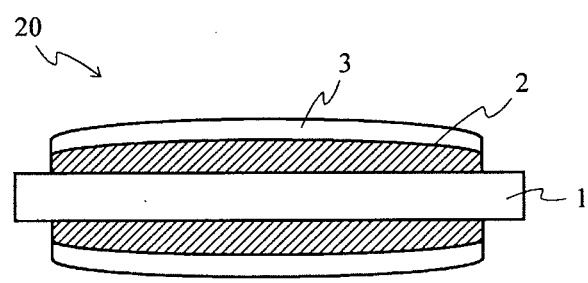
FIG. 2 is a drawing illustrating another example of preferred embodiments of an electrifying roller of the present invention.

FIG. 2 is a drawing illustrating another example of preferred embodiments of an electrifying roller of the present invention. Since it is important that a uniform working face be formed in the longitudinal direction when pressed on the photoconductor drum, the electrifying roller 20 has a crown shape whose diameter at the center portion is larger than those at the end portions.

As a crown amount which represents the degree of the protrusion in which the portion at the center is more protruded than the portions at the ends in the roller length direction in the cross section of the roller length direction, 50 to 300 μm is preferably employed. By employing this amount, normal images may be made more preferable. If the crown amount is smaller than 50 μm, the contact pressure at the center of the roller in the roller length direction becomes low, while if the crown amount is larger than 300 μm, the portion at the center of the roller in the roller length direction makes too strong contact. Both cases possibly cause ununiformity of the charge amount. The measurement of the crown amount of the electrifying roller of the present invention was performed by using High Precision Laser Measuring Machine LSM-430v manufactured by Mitutoyo Co., Ltd. External diameters at the center portion and at 90 mm from the center portion in the direction from the center portion to the end portion were measured by this measuring machine, and a roller crown amount is defined as the difference between the external diameter at the center portion and the average of the external diameters at 90 mm from the center portion in the directions from the center portion to the end portions. For example, for an electrifying roller having a roller length of 250 mm, external diameters are measured at three point, at 35 mm, 125 mm and 215 mm from one end of the roller. In this case, the crown amount (μm) is calculated by the following formula (1):

$$\text{crown amount}(\mu m) = \{B - (A+C)/2\} \times 1000 \quad (1),$$

where the external diameter at 35 mm from one end of the roller is A (mm), the external diameter at 125 mm from one end of the roller is B (mm) and the external diameter at 215 mm from one end of the roller is C (mm).

In the present invention, the electrifying rollers 10 and 20 preferably have a deviation (precision of film thickness) of not larger than 70 μm in the whole range in the roller length direction. The electrifying rollers 10 and 20, and the photoreceptor are revolving while being in contact with each other, and when the deviation of the electrifying rollers 10 and 20 is large, a gap between the electrifying rollers 10 and 20, and the photoreceptor is generated. Further, the gap distance varies. In this case, toner particle and external additives which remain on the photoreceptor are likely to intrude into the gap and then attached irregularly on the electrifying rollers 10 and 20. As a result, the surface of the roller becomes mottled with the remain, which produces an image with a low quality. It is noted that the measurement of the deviation of the electrifying rollers 10 and 20 of the present invention was performed by using High Precision Laser Measuring Machine LSM-430v manufactured by Mitutoyo Co., Ltd. The external diameters for five points in the roller length direction were measured by this measuring machine, and a deviation was defined as the average of the difference between the maximum value and the minimum value of the measured external diameter for each point.

In the manufacturing method of the electrifying rollers 10 and 20, a coating incorporating an ultraviolet curing resin having a phosphoester group is applied on the shaft 1, and subjected to ultraviolet (UV) to form the elastic layer 2. Then, a coating solution of the surface layer 3 is applied on the elastic layer 2, followed by heat curing or irradiation of ultraviolet (UV) or the like. For example, in the case where water-based coating of heat curing resin is applied to the surface layer, the curing temperature, at this process, may be set about 105° C. or higher which is a temperature higher than the boiling temperature of the solvent. By forming the elastic layer by an ultraviolet curing resin, the manufacturing process and manufacturing time may be shortened.

In the present invention, the irradiation intensity and integrated light intensity of the ultraviolet (UV) for curing an ultraviolet curing resin are not limited as long as the ultraviolet curing resin can be cured sufficiently. For example, the ultraviolet is irradiated at an irradiation intensity of 100 to 700 W/cm$^2$ and an integrated light intensity of 200 to 3000 mJ/cm$^2$.

EXAMPLES

The present invention will be described more concretely by way of examples.

Example 1 and Comparative Examples 1 and 2

A coating liquid which has a formulation shown in the Table 1 below was applied on the surface of the metal shaft member 1 in a hollow cylinder shape (material: aluminum A6063, length: 230 mm, thickness: 0.7 mm, external diameter φ: 18 mm) by a die coater, irradiated at an UV irradiation intensity of 1500 W/cm$^2$ for 5 seconds, whereby each of elastic layers made of an ultraviolet curing resin having a thickness of 1 mm was obtained. The film volume specific resistivities (Ω·cm) of the obtained elastic layers made of the ultraviolet curing resin were measured. The oligomers A to C in the Table 1 have the same backbone and are different in that a phosphoester group is present or absent in the structure.
<Measurement of Volume Specific Resistivity>

A volume specific resistivity (Ω·cm) at a measuring voltage of 250 V was measured at a temperature of 23° C. and at a relative humidity of 50% by using, as a measuring apparatus, Hiresta-UP (manufactured by Mitsubishi Chemical Corporation) to which a UR probe is connected.

Further, on the exterior of each of the obtained elastic layers made of an ultraviolet curing resin, a coating solution having a formulation shown in the Table 2 below was coated by a dipping method to form a resin surface layer having a thickness of 7 μm, thereby obtaining an electrifying roller as shown in FIG. 1.
<Evaluation of Images>

The obtained electrifying roller was placed on a commercially available image forming apparatus to evaluate an image. The results are shown in Table 1 in combination. Evaluation criteria for the image evaluation is shown as follows.

<Evaluation Criteria>
Good: No concentration irregularities, and no black patches (no remains during transfer)
No good: Concentration irregularities, and four or more black patches
* Concentration irregularities and black patches are failures which are less likely to occur when the roller resistance value is lower.

TABLE 1

|  |  |  | Example 1 | Comparative Example 1 | Comparative Example 2 |
|---|---|---|---|---|---|
| Added Component (parts by mass) | Oligomer | Urethane oligomer A*[1] | 60 | — | — |
|  |  | Urethane oligomer B*[2] | — | 60 | — |
|  |  | Urethane oligomer C*[3] | — | — | 60 |
|  | Monomer | MTG-A*[4] | 40 | 40 | 40 |
|  | Initiator | IRGACURE184*[5] | 0.5 | 0.5 | 0.5 |
| Evaluation |  | Volume specific resistivity ($\Omega \cdot cm$) | $1.86 \times 10^7$ | $2.04 \times 10^8$ | $5.24 \times 10^8$ |
|  |  | Image evaluation | Good | No good | No good |

*[1]Urethane oligomer A: acrylic urethane oligomer having two functionalities with phosphoester group
*[2]Urethane oligomer B: acrylic urethane oligomer having two functionalities with phosphoester group
*[3]Urethane oligomer C: acrylic urethane oligomer having two functionalities without phosphoester group (amine group is introduced)
*[4]Trade name: MTG-A manufactured by KYOEISHA CHEMICAL Co., LTD.
*[5]Trade name: IRGACURE 184 manufactured by Ciba Specialty Chemicals KK.

TABLE 2

| Example 1, Comparative Examples 1 and 2 | | |
|---|---|---|
| Added ingredient (parts by mass) | Caprolactone modified acrylic urethane | 100 |
|  | Nurate modified HDI*[6] | 50 |
|  | Carbon black | 35 |
|  | Methyl ethyl ketone | 300 |

*[6]nurate modified HDI (hexamethylene diisocyanate)

The electrifying rollers in Example 1 had good volume specific resistivity compared with the electrifying rollers in Comparative Examples 1 and 2, and neither of them had a problem such as bleed out of the electrically conductive material. Among the images of image forming apparatus using the electrifying rollers of Example 1, Comparative Examples 1 and 2, only the image using the roller of Example 1 was good.

Examples 2 to 5

Next, an electrifying roller was manufactured in the same manner as in Example 1 except that the thickness of the elastic layer was changed as shown in the Table 3. For each of the obtained rollers, measurement of the difference between the external diameters of the roller at the right side and the left side and evaluation of the images were performed according to the following description. The results are shown in the Table 3 in combination.

<Measurement of the Difference Between the External Diameters of the Roller at the Right Side and the Left Side>
By using High Precision Laser Measuring Machine LSM-430v manufactured by Mitutoyo Corporation, external diameters at 90 mm from the center portion in the direction from the center portion to the end portion were measured, and the difference between the diameters at 90 mm to the end portions was calculated to define the difference (μm) between the external diameters of the roller at the right side and the left side.

<Evaluation of Images>
The obtained electrifying roller was incorporated in a printer Laser jet CP 1210 manufactured by Hewlett-Packard Company and images were evaluated by the uniformity of the concentration of the toner. The evaluation criteria for the image evaluation is shown as follows.

<Evaluation Criteria>
○: No irregularities and uniform in the concentration across the image.

Δ: Black patches exist in a part of the image, and irregularity in the concentration is partly observed.

x: Black patches exist in most part of the image, and irregularity in the concentration is observed in many parts.

TABLE 3

|  | Examples 5 | Examples 6 | Examples 7 | Examples 8 |
|---|---|---|---|---|
| Thickness of elastic layer (mm) | 0.9 | 1.1 | 1.3 | 1.5 |
| Difference between the external diameters of the roller at the right side and the left side (μm) | 7 | 8 | 20 | 50 |
| Image evaluation | ○ | ○ | ○ | Δ |

As shown in the above table, it is found that when the thickness of the elastic layer is too high, the difference between the external diameters of the roller at the right side and the left side becomes too large and the quality of the image decreases.

DESCRIPTION OF SYMBOLS

| | |
|---|---|
| 1 | shaft |
| 2 | elastic layer |
| 3 | surface layer |
| 10, 20 | electrifying roller |

The invention claimed is:

1. An electrifying roller comprising a shaft, an elastic layer formed on the periphery of the shaft, and a surface layer formed on the periphery surface of the elastic layer, wherein
said elastic layer is formed by an ultraviolet curing resin having a phosphoester group, and
wherein
said ultraviolet curing resin is made of a compound represented by the follow Formula (1):

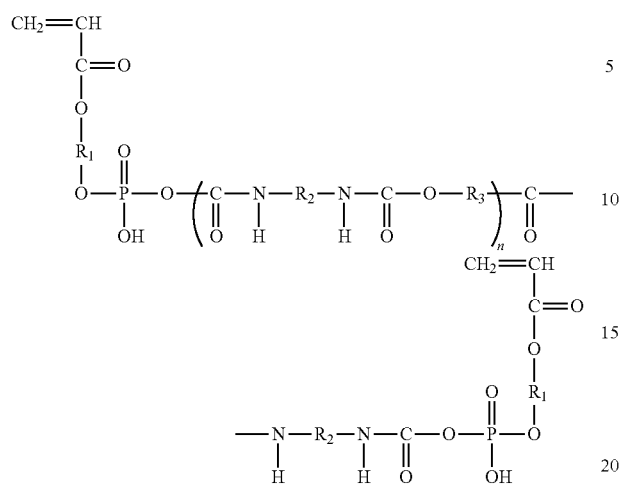

(1)

(wherein R₁ is represented by the following Formula (2):

(2)

(where m is an integer from 1 to 10),
R₂ is represented by any one of the following Formulae (3) to (9):

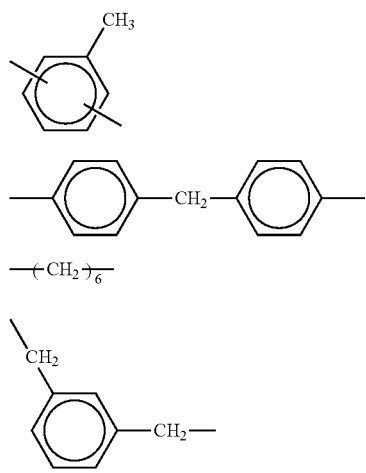

R₃ is represented by any one of the following Formulae (10) to (12):

$$-\!\!\!-\!\!(CH_2-CH_2-O)_{r}\!\!\!-\!\!\!-$$ (10)

$$-\!\!\!-\!\!(CH_2-\underset{\underset{CH_3}{|}}{CH}-O)_{s}\!\!\!-\!\!\!-$$ (11)

$$-\!\!\!-\!\!(\underset{\underset{CH_2}{|}}{\overset{\overset{CH_2}{|}}{C}}-\underset{\underset{CH_2}{|}}{\overset{\overset{CH_2}{|}}{C}}-O)_{t}\!\!\!-\!\!\!-$$ (12)

(where r, s and t are an integer from 10 to 150), and n is an integer from 1 to 10).

2. The electrifying roller according to claim 1, wherein the volume specific resistivity of said elastic layer is $1\times10^4$ to $1\times10^8$ Ω·cm.

3. The electrifying roller according to claim 1, wherein the thickness of said elastic layer is 0.9 to 1.3 mm.

4. The electrifying roller according to claim 1, wherein said shaft is a hollow cylinder or solid cylinder made of metal.

* * * * *